United States Patent [19]

Harrington et al.

[11] Patent Number: 4,555,007
[45] Date of Patent: Nov. 26, 1985

[54] SELF ADJUSTING THRUST, LOW ANGULAR CONTACT BEARING

[75] Inventors: Richard F. Harrington, Lincolnwood; Richard T. Dagiel, Elk Grove Village; Villy Brown, Chicago, all of Ill.

[73] Assignee: Aetna Bearing Company, Chicago, Ill.

[21] Appl. No.: 561,642

[22] Filed: Dec. 15, 1983

[51] Int. Cl.[4] .............................................. F16D 19/00
[52] U.S. Cl. ................................... 192/98; 192/110 B
[58] Field of Search ................. 192/98, 110 R, 110 B; 308/233, 235, 236

[56] References Cited

U.S. PATENT DOCUMENTS

| | | | |
|---|---|---|---|
| 1,431,551 | 10/1922 | White | 192/98 X |
| 3,882,979 | 5/1975 | Limbacher et al. | 192/98 |
| 3,920,107 | 11/1975 | Limbacher | 192/98 |
| 3,921,776 | 11/1975 | Sonnerat | 192/98 |
| 4,029,186 | 6/1977 | De Gennes | 192/98 |
| 4,046,436 | 9/1977 | Brown | 308/233 |
| 4,228,882 | 10/1980 | Huber et al. | 192/98 |
| 4,365,850 | 12/1982 | Perriochot et al. | 308/26 |
| 4,371,068 | 2/1983 | Billet | 192/98 |

Primary Examiner—Stephen F. Husar
Attorney, Agent, or Firm—Trexler, Bushnell & Wolters, Ltd.

[57] ABSTRACT

There is discussed a bearing assembly adapted for engagement by a plurality of clutch fingers rotating about a clutch finger axis of rotation. The bearing assembly comprises a rotational thrust face member with a cone raceway member affixed thereto, a cup raceway member rotatable relative to the cone raceway member, with a plurality of bearing elements disposed between the raceway members. A shell housing member for the bearing assembly is provided, which is located adjacent the cup raceway member, and is adapted to be engaged upon a cylindrical carrier sleeve. The carrier sleeve defines a second axis which is not necessarily coincident with the clutch finger axis of rotation. The respective bearing components are sized such that only the shell housing is engaged upon the carrier sleeve, with the remaining rotatable components, viz., the thrust face member, the raceways and the bearing elements free to float internally of the housing, and to adjust their respective positions in response to the rotational forces created, and thereby assume rotational positions coincident with the axis of rotation of the clutch fingers, to thereby reduce bearing noise and wear.

8 Claims, 2 Drawing Figures

SELF ADJUSTING THRUST, LOW ANGULAR CONTACT BEARING

BACKGROUND OF THE INVENTION

This invention relates generally to clutch release type thrust bearings, and more particularly concerns a clutch release bearing which will accommodate and adjust to slight rotational misalignment between the bearing and the associated clutch fingers.

Automotive clutch throw-out or release bearings are commonly used to provide a force-transmitting device between a foot-operated clutch pedal lever and the clutch release fingers. The high-quality, high-quantity production of automotive clutches, clutch bearings, and associated parts requires that the parts be assembled at minimum cost, and be designed and arranged to accept slight part misalignment. These misalignments can arise as a result of minor variations in part sizes and shapes, even though each part may be within manufacturing tolerances. Misalignments can also be caused by the rigors of the substantial operating forces and long periods of use to which the parts are subjected. By way of example, clutch throw-out bearing assemblies are described and claimed in U.S. Pat. No. 3,909,086 issued Sept. 30, 1975 and in U.S. Pat. No. 4,046,436 issued Sept. 6, 1977.

The present bearing is designed for use with a constant running clutch having a slight preloading of the clutch bearing relative to the adjacent clutch fingers, so that the bearing rotates with the clutch fingers whenever the associated automotive engine is running.

The advantages of this invention will become apparent upon reading the following detailed description and upon reference to the drawings. Throughout the drawings, like reference numerals refer to like parts.

DETAILED DESCRIPTION

Figures 1, 2:
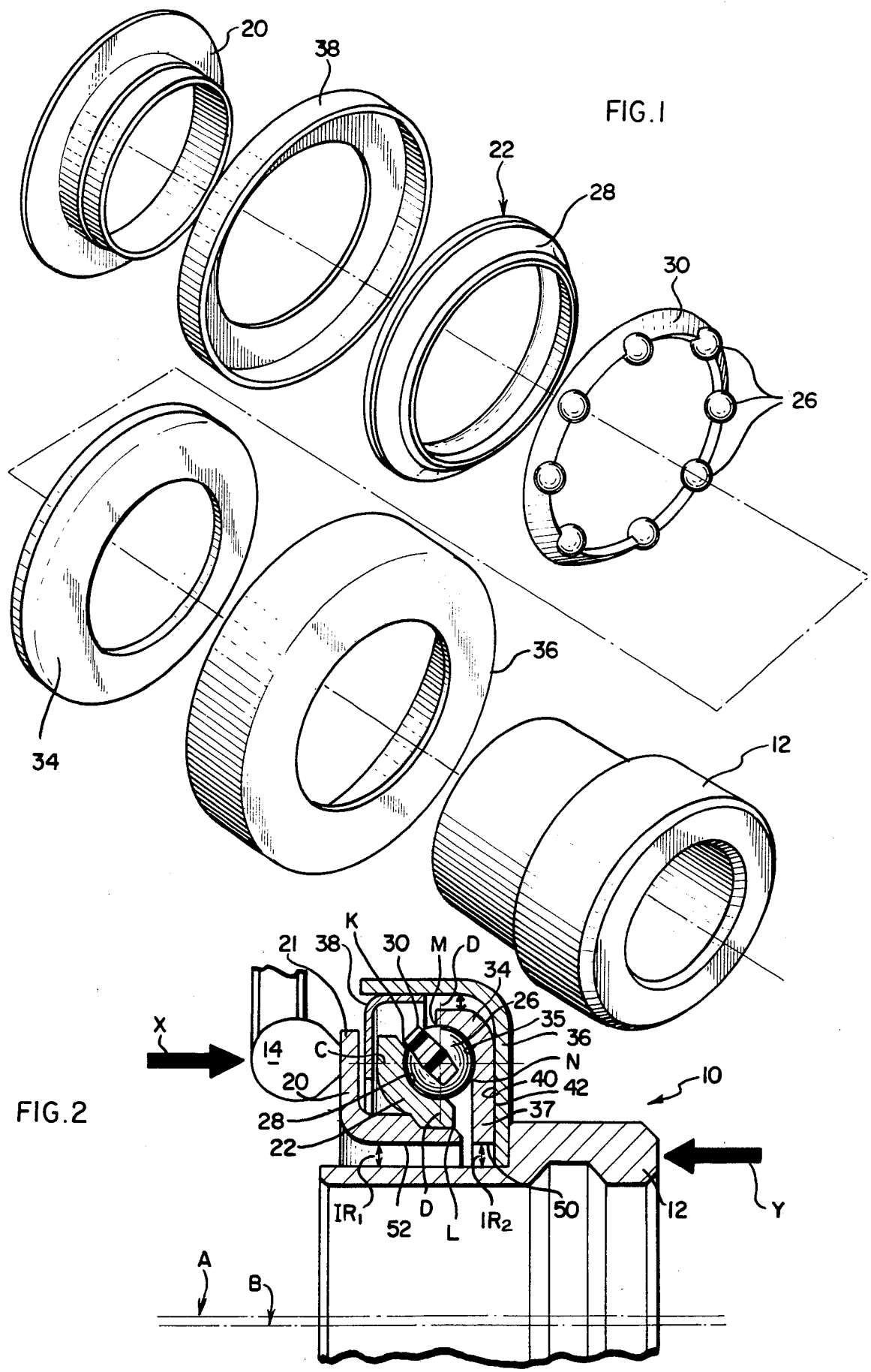
FIG. 1 is an exploded view of the novel bearing assembly of the present invention.
FIG. 2 is fragmentary sectional view showing the novel bearing and associated parts in its simple and installed condition.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

As shown in the drawings, the novel clutch bearing 10 is adapted to be installed upon a cylindrical carrier sleeve 12 in a position for interengagement with a plurality of normally rotating clutch fingers 14 of the clutch mechanism, which clutch fingers rotate about a clutch finger center line or axis of rotation A, FIG. 2. The elongated carrier sleeve 12 which is moved axially on a shaft (now shown) defines a center line or axis B. It will be noted that for purpose of illustration the axis B of rotation A of the clutch fingers 14 is not coincidental with the axis of the carrier sleeve 12, which has been employed to demonstrate the slight co-axial misalignment that may occur in use or assembly.

The basic bearing assembly 10 includes a thrust face member 20 having a generally L-shaped cros-sectional configuration and a face flange 21 for engagement with the clutch fingers 14, so as to receive a loading force acting in a first direction X as shown by the arrow in FIG. 2. It will be understood that the carrier sleeve 12 is carried on a shaft (not shown) and, consequently, upon depression of the clutch pedal, the sleeve 12 is moved axially in a second direction Y to force the thrust bearing 10 into engagement with the clutch fingers 14 to overcome the force X imposed upon the thrust bearing 10 by the clutch fingers 14. With continued reference to FIG. 2, the thrust face member 20 is affixed to a cone raceway member 2; here, the thrust face member 20 is attached to the cone raceway member 22 by a press fit. Thus the thrust face member 20 will rotate with the cone raceway member 22 when the thrust face member 20 is engaged by the rotating clutch fingers 14. This finger-thrust face interengagement is a usual condition; it is expected that the fingers will engage the thrust face with a slight preloading in the x direction, so that the thrust face and other bearing parts will rotate with the clutch fingers 14 whenever the clutch is rotating. It will be noted that the thrust face member 20 is spaced apart from contact with the carrier sleeve 12 by a radial distance $IR_1$.

A plurality of bearing elements, here ball bearing elements 26, are sized and adapted to engage an annular raceway 28 formed on the cone raceway member 22. The ball bearing elements are carried by a combination carrier-spacer ring 30 which maintains the ball bearing elements 26 in an evenly spaced array. This raceway 28 is shaped to engage the balls 26 with a smooth, arcuate contact. As shown particularly in FIG. 2, this contact extends from a point K radially outwardly of the axial center line C of each bearing ball 26 to a point L axially beyond the radial center line D of that bearing ball 26. The overlap or extension of the contact surfaces and center lines is on the order of 0.030 inches. This overcenter contact enables the bearing to handle forces in the radial direction, which would tend to separate the bearing components as explained more fully hereinafter.

The basic bearing assembly 10 further includes a cup raceway member 34 arranged to engage the bearing elements 26 in a manner generally opposed to the cone raceway 22. The cup raceway 34 includes a raceway surface 35 for engagement with the ball bearing elements 26, which raceway surface extends from a point M axially beyond the radial center line D of the bearing ball element 26 to a point N radially inwardly of the axial center line C of that bearing ball element 26. It will be recalled that the cone raceway surface 28 also overlaps the radial and axial center lines D and C. Thus, complete support and capturing action is provided to the ball bearing elements 26 in both the axial and radial directions which is important in accepting and dealing with the axial bearing load forces acting in the X and Y directions, and those that occur in the radial direction as the bearing rotates at high speed. More specifically, when the bearing is rotating centrifugal forces are created which force the ball bearing elements 26 radially outward, tending to separate to raceway members 22 and 34. If this occurs, the areas of engagement between the ball bearings 26 and the raceway surfaces 28 and 35 will change which can lead to excessive wear and early bearing failure. In the present design, the overlapping of the radial axis D by at least 0.030 inches by both the raceway members 22 and 34 overcomes any tendency for the balls to move outwardly and accommodates radial loading.

In addition to the raceway surface 35 on the cup raceway member 34, it should be noted that the member 34 also includes a radially inward extending annular portion 37 that extends well past location N, which is the radially innermost extent of the raceway surface 35. This annular portion 37 included an axially outwardly facing, annular surface 42 which is engaged with a corresponding surface 40 on the bearing housing, as will be detailed more fully hereinafter.

A center line F of bearing ball/raceway contact is shown in FIG. 2. In this regard, it will be seen that this contact centerline F forms an acute angle with the axial centerline C of the bearing balls. This contact centerline F is thus also at an angle to the direction X and Y of the thrust forces, such that angular contact is attained between the respective raceway member 22 and 34, and the ball bearing elements 26.

A bearing shell or housing member 36 is located about the raceway members 22 and 34, and serves to maintain the components of bearing 10 in assembly. This shell housing member 36 is mounted to the carrier sleeve 12 with a press fit. To exclude dirt or other corruption, and to provide a labyrinth type seal for the internal lubricant, the housing 36 includes a cup element 38 that is pressed fitted into the main shell housing 36 so as to provide a substantially enclosed housing array for the bearing without engaging any of the other bearing parts as illustrated in FIG. 2. The cup element or flange 38 extends between the thrust face member 20 and the cone raceway member 22 to define the labyrinth seal paths.

The bearing 10 is designed such that the various internal and rotating components, namely the thrust face 20, cone raceway 22, ball bearings 26 and the cup raceway 34, can accommodate slight misalignments between their normal axis B and the axis of rotation A of the clutch fingers, the latter being fixed. Toward this end the above mentioned components are free to float radially within the housing 36. More specifically, when the rotating clutch fingers 14 are engaged against the thrust face 20, the fingers and thrust face frictional engagement causes the fingers 14 and thrust face member 20 to rotate together as a unit. Under the rotational forces generated the thrust face member 20 will tend to move radially upwardly slightly, as viewed in FIG. 2, to adjust its position to the axis of rotation A of fingers 14. Since the cone raceway 22 is affixed to the thrust plate 20 with a press fit, the cone raceway 22 also tends to adjust its radial position and rotate about the axis A. As can be envisioned from FIG. 2, this movement will also force the ball bearings 26 and the associated spacer ring 30 upwardly along with the cup raceway 34, which all will now become coaxially oriented as positioned with respect to the axis A. The housing 36 is press fitted to the carrier sleeve 12 and continues to remain coaxially aligned with the axis B. To accommodate this radial floating and adjustment movement of the cup raceway 34 relative to the housing 36, the shell housing 36 and adjacent cup raceway 34 have adjacent, abutting, substantially flat surfaces 40 and 42 which are oriented parallel to one another and perpendicularly to the axes A and B. It has been discovered that, by so forming and arranging these surfaces 40 and 42, relative angular movement or rotation between the surfaces is discouraged, yet the cup raceway is free to move transversely of the axis B. Separation-type movement of the cup raceway 34 from the ball elements 26 is also minimized or eliminated and internal bearing assembly wear and operating noise is correspondingly minimized.

In order to accommodate and provide for the above discussed movement of the components of bearing 10, certain dimensional factors must be taken into account. With reference to FIG. 2, it should be noted that an annular spacing or clearance OR between the outer diameter of the cone raceway 34 and the shell or housing 36 is provided. Further, annular clearances are provided between the inner terminus 50 of the cup raceway 34 and carrier sleeve 12, and the inner diameter of the thrust member 20 and said carrier sleeve 12; these clearances are designed $IR_2$ and $IR_1$, respectively. As such, it can be seen that with respect to the bearing assembly 10, only the housing or shell 36 is affixed to the carrier sleeve 12, and the remaining components of the bearing 10, viz., thrust member 20, raceway members 22 and 34 and ball bearings 26, are free to float transversely to the B axis in order to adjust their relative positions to coincide with the axis of rotation A of clutch fingers 14.

It is preferred that each of the clearances OR, $IR_1$ and $IR_2$ be on the order of at least 0.040 inches. In the drawings these clearances have been exaggerated for purposes of illustration. Also, it can be appreciated that the smallest of these three clearances will determine the degree of adjustment movement available from the bearing.

As such there has been disclosed a clutch release bearing construction that can accommodate both radial and axial loads, yet can adjust to slight misalignment with respect to the clutch fingers or actuators. While a preferred embodiment has been disclosed, it is envisioned that those skilled in the art may devise various alternate designs once possessed of this disclosure, and as such it is not intended to limit the invention to the preferred embodiment illustrated and described. It is intended that such alternative or equivalent design be included within the spirit and scope of the invention as defined by the claims appended hereto.

The invention is claimed as follows:

1. A clutch release bearing assembly for use in combination with a carrier sleeve, which carrier sleeve defines a first axis, said bearing assembly adapted to be brought into engagement with the rotating clutch fingers, or the like of a clutch mechanism, which clutch fingers are rotating about a second axis which may not be coincidental with said first axis, the rotational components of said bearing assembly being adapted to adjust their rotational orientation to coincide with the second axis of rotation of said clutch fingers, said bearing assembly comprising; an annular thrust face member for engaging said clutch fingers, an annular cone raceway member affixed to the thrust face member, an annular cup raceway member rotatable relative to the cone raceway member, a plurality of bearing elements disposed between the raceway members, an annular shell housing member adjacent the cup raceway member and adapted to be mounted to a cylindrical carrier sleeve in surrounding relation to said raceway members, said cup raceway member having an outer diameter less than the inner diameter of the shell housing member, and said thrust face member and said cup raceway member each having an inner diameter greater than the outer diameter of carrier sleeve to which the bearing assembly is mounted, and the cup raceway member and shell housing member being movable relative to one another, such that the thrust face member, the cone raceway member and the cup raceway member are free to float in a radial direction and thereby adjust their respective positions to the axis of rotation of the clutch fingers which will engage said thrust face member.

2. A bearing assembly according to claim 1 further including in combination a cylindrical carrier sleeve wherein the thrust face member terminates at position radially spaced apart from the carrier sleeve by a first inner radial dimension, and wherein said cup raceway terminates at a position radially spaced apart from the overlying shell housing member by an outer radial dimension, so as to permit said thrust face member floating action without damage to adjacent bearing parts.

3. A bearing assembly according to claim 2 wherein said cup raceway member terminates at a position radially spaced apart from a carrier sleeve by a second inner radial dimension so as to permit said thrust face member floating action.

4. A bearing assembly according to claim 1 wherein the shell housing and cup raceway members include adjacent, engaged surfaces, which are substantially flat and oriented parallel to one another, whereby angular or rotational motion between said surfaces and members is discouraged.

5. A bearing assembly according to claim 1 wherein said cone raceway member engages said thrust face member with a press fit.

6. A bearing assembly according to claim 1 wherein said bearing assembly includes a carrier sleeve, and wherein said carrier sleeve engages said shell housing with a press fit.

7. A bearing assembly according to claim 4 wherein said shell housing and cup raceway member surfaces are also oriented substantially perpendicularly to the axis of rotation of said cylindrical carrier sleeve.

8. A bearing assembly according to claim 1 wherein said bearing elements include spherical ball elements engaging said cup raceway member and said cone raceway member with respective surface-to-surface contacts, the cup raceway/ball bearing element surface-to-surface contact extending from a point axially beyond the radial centerline of the ball bearing element to a point radially inwardly of the axial centerline of the ball bearing element, so as to minimize bearing element-raceway separation and consequent wear and noise.

* * * * *